United States Patent [19]

Mizusawa

[11] Patent Number: 5,539,726
[45] Date of Patent: Jul. 23, 1996

[54] BACK-UP SYSTEM FOR PARTIALLY BACKING UP INFORMATION SIGNALS

[75] Inventor: Tunetoshi Mizusawa, Tokyo, Japan

[73] Assignee: NEC Corporation, Tokyo, Japan

[21] Appl. No.: 442,967

[22] Filed: May 17, 1995

[30] Foreign Application Priority Data

May 18, 1994 [JP] Japan .................................. 6-103514

[51] Int. Cl.⁶ ........................................................ H04J 1/14
[52] U.S. Cl. ........................................ 370/16; 370/110.1
[58] Field of Search ............................... 370/14, 13, 16, 370/15, 58.1–58.3, 68, 60, 112, 110.1; 375/8.1, 8.2; 340/825.01; 415/8, 103; 395/181, 182.01, 182.02

[56] References Cited

U.S. PATENT DOCUMENTS

| | | | |
|---|---|---|---|
| 5,010,550 | 4/1991 | Hirata | 370/16 |
| 5,345,438 | 9/1994 | Ozaki | 370/16 |
| 5,406,564 | 4/1995 | Okita | 370/16 |
| 5,442,622 | 8/1995 | Hokari | 370/16 |

*Primary Examiner*—Douglas W. Olms
*Assistant Examiner*—Ajit Patel
*Attorney, Agent, or Firm*—Whitham, Curtis, Whitham & McGinn

[57] ABSTRACT

A transmission path back-up system according to the invention has a multiplexer for dividing a set of time slots on a digital private line into a first set of time slots to accommodate the group of signals to be backed up and a second set of time slots to accommodate the group of signals not to be backed up. A selector sends out these multiplexed signals on the digital private line as transmission path when the digital private line is in a normal state, or selectively extracts the group of signals to be backed up and sends them out to an exchange line when the digital private line is in trouble. The back-up system makes it possible to realize an economical and yet reliable network which can extract and send out to the back-up ISDN line only the set of time slots for the group of signals to be backed up when the private line is in trouble.

6 Claims, 5 Drawing Sheets

BACK-UP SYSTEM FOR PARTIALLY BACKING UP INFORMATION SIGNALS

BACKGROUND OF THE INVENTION

The present invention relates to a back-up system for transmission paths, and more particularly to a back-up system for transmission paths using an exchange line, such as an ISDN line, as back-up line in response to trouble on a private line, such as a high-speed digital private line.

A conventional back-up system for transmission paths of this kind would be provided with a pair of multiplexers inter-connected by a high-speed digital private line (hereinafter referred to as simply "private line"). For backing up this private line when it is in trouble, there are used ISDN (integrated service digital network) public lines. This conventional back-up system, however, cannot back up the private line unless there is an ISDN line whose speed (transmission capacity) matches the transmission speed of the private line, and there is another problem of a high backing-up cost if all the channels multiplexed on the private line are to be backed up.

SUMMARY OF THE INVENTION

An object of the present invention is to provide a highly reliable and economical back-up system for transmission paths, which is designed to selectively back up links or channels multiplexed on a private line.

Another object of the invention is to provide a back-up system for transmission paths, which makes it possible to multiplex data and speech signals on the same private line by multiplexing speech channels involving public-private connection on non-backed up channels.

According to the invention, a back-up system uses exchange lines as back-up lines in response to any trouble on a digital private line. The back up system comprises a multiplexer for dividing a set of time slots on the digital private line into a first set of time slots to accommodate the group of signals to be backed up and a second set of time slots to accommodate the group of signals not to are backed up so that the two groups be separately multiplexed. A selector sends out these multiplexed signals on this digital private line as a transmission path when the digital private line is in a normal state, or selectively extracting the group of signals to be backed up and sending them out to the exchange line when the digital private line is in trouble.

The present invention makes it possible to realize an economical and yet reliable network which can extract and send out to the back-up ISDN line only the set of time slots for the group of signals to be backed up when the private line is in trouble.

BRIEF DESCRIPTION OF THE DRAWINGS

The above-mentioned and other objects, features and advantages of the present invention will become more apparent from the following detailed description when taken in conjunction with the accompanying drawings, wherein.

DETAILED DESCRIPTION OF THE PREFERRED EMBODIMENT

To facilitate understanding of the present invention, a back-up system according to the prior art will be described first with reference to FIG. 1. For the sake of brevity, the following description will refer only to communication from a multiplexer 1 to another multiplexer 2, and dispense with any mention of communication vice versa.

Figure 1:
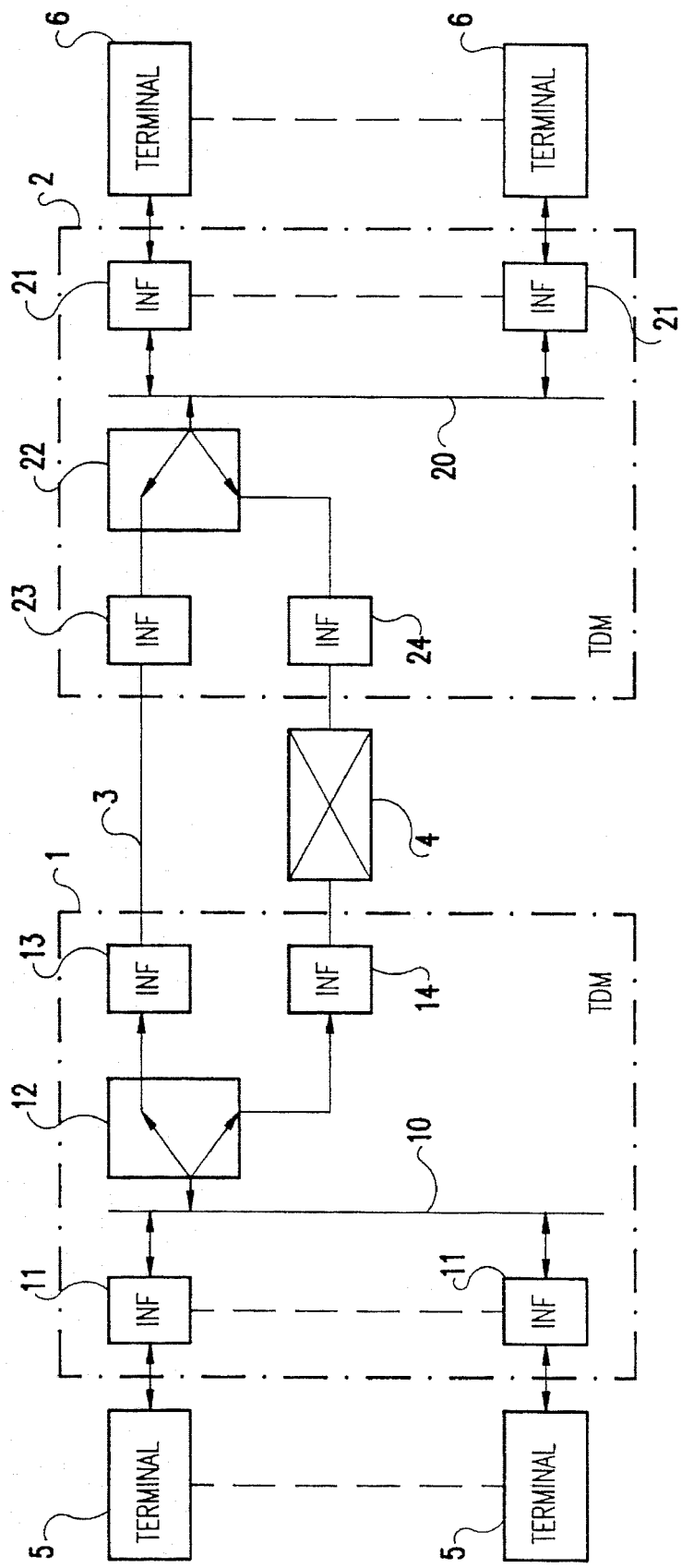
FIG. 1 is a block diagram illustrating a back-up system according to the prior art.

Referring to FIG. 1, a pair of multiplexers 1 and 2, respectively having pluralities of terminals 5 and 6 under their control, are inter-connected by a high-speed digital private line (hereinafter referred to as simply "private line") 3 to accomplish high-speed digital communication. To back up this private line 3 when it is in trouble, an ISDN public line 4 is used.

The multiplexer 1 has terminal interfaces 11, each corresponding to one of the terminals 5. A multiplexed bus 10 multiplexes and transmits data signals from these terminal interfaces 11. A switch 12 switches these multiplexed data signals. A private line interface 13 and an ISDN interface 14 lead the multiplexed data signal out to the private line 3 or the ISDN exchange line network 4 according to the way in which the switch 12 is set.

The multiplexer 2 has the same configuration, and equivalent parts to the constituent elements of the multiplexer 1 are assigned reference numerals whose less significant digits are the same as those of the corresponding elements in the multiplexer 1.

Communication between opposite terminals 5 and 6 is terminated by the terminal interfaces 11 and 21, demultiplexed by the multiplexed buses 10 and 20, and connected to the respectively opposite multiplexers via the switches 12 and 22 and the private line 3.

The switches 12 and 22 are respectively connected to the multiplexed buses 10 and 20 and the private line interfaces 13 and 23 as long as the private line 3 is in a normal state, i.e. no alarm is detected by the private line interfaces 13 and 23. Therefore, usual communication takes place via the private line 3.

If the private line 3 runs into trouble and alarms are detected by the private line interfaces 13 and 23, the switches 12 and 22 will be turned toward the ISDN interfaces 14 and 24, respectively. Thus, the ISDN interface 14 on the call initiating side initiates a call and, upon detection of the arrival of this call at the opposite station, the switch 22 on the call receiving side is turned to the ISDN interface 24 side. Back-up of the private line 3 is thereby made possible.

However, the conventional back-up system, as described above, cannot back up the private line unless there is available an ISDN line whose speed matches the transmission speed of the private line. Moreover, there is another problem of a high backing-up cost if all the links multiplexed on the private line are to be backed up.

Figure 2:
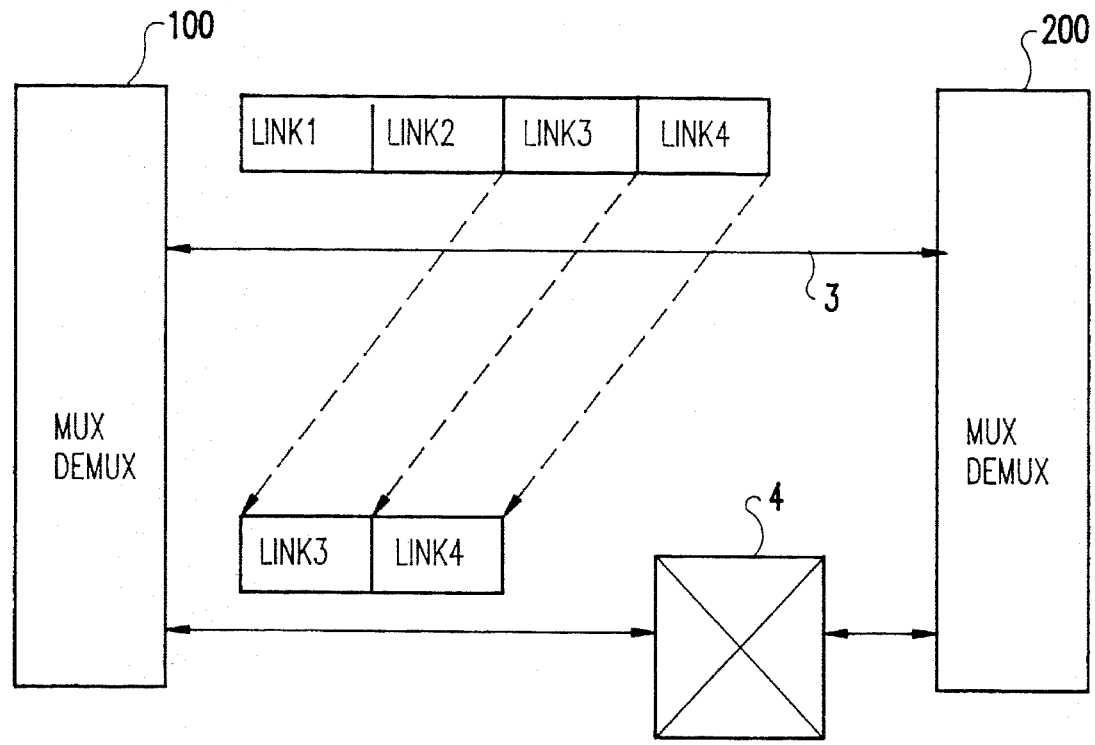
FIG. 2 is a block diagram illustrating the principle of the invention.
Figure 3:
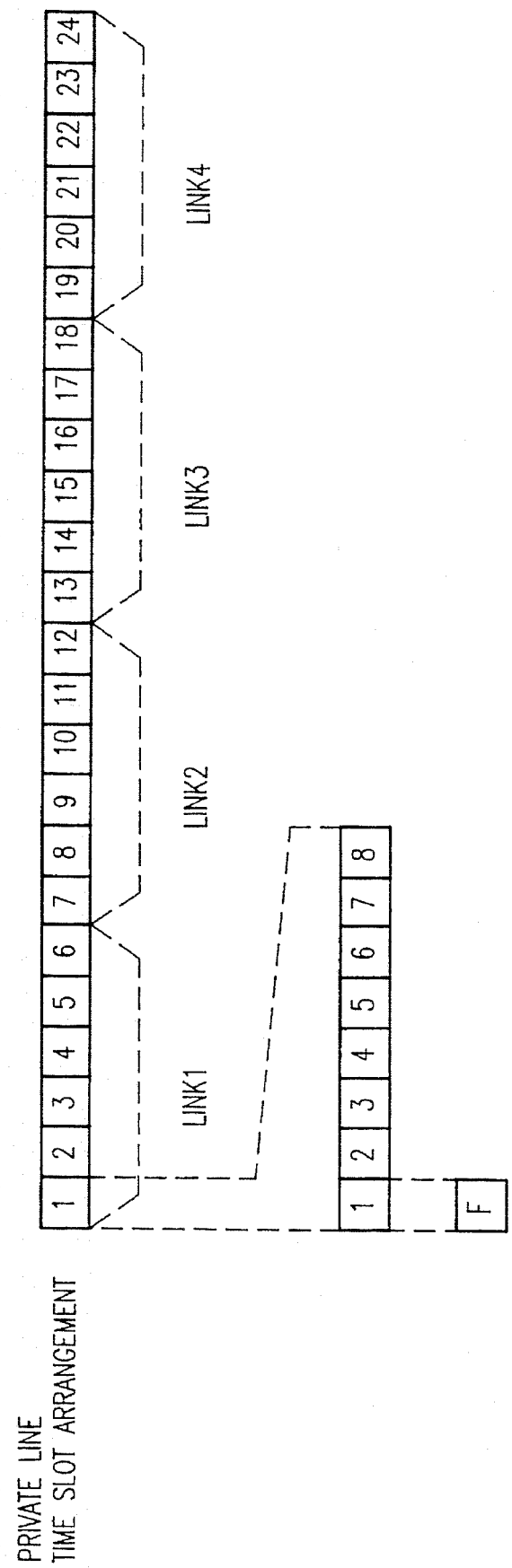
FIG. 3 is a diagram showing an example of signal format in the block diagram of FIG. 2.

FIGS. 2 and 3 are diagrams illustrating the principle of the present invention to outline its characteristics, with FIG. 2 showing the system configuration. In FIG. 2, a multiplexer/demultiplexer 100 on the west side and another multiplexer/demultiplexer 200 on the east side are inter-connected by a private line 3 and an ISDN line network 4 to back it up.

In the multiplexed data format on the private line, as illustrated in FIG. 3, a plurality of time slots (1 through 24) are divided into four groups in this example, and the sets into which the time slots are divided are called links here.

In this example, links 1 and 2 are supposed to be the sets of time slots not to be backed up, and links 3 and 4, those of time slots to be backed up. Therefore, in transmitting data from the multiplexer/demultiplexer 100 to the multiplexer/demultiplexer 200 of the opposite station, signals are multiplexed in the format of time slot arrangement shown in FIG. 3, and the multiplexed signals are transmitted via the private line 3. Which signals are to be backed up is determined according to the relative importance and urgency of each signal.

When the private line 3 is in trouble, only the links 3 and 4 are selectively extracted in the multiplexer/demultiplexer 100, and sent out to the multiplexer/demultiplexer 200 of the opposite station via the back-up ISDN line network 4.

This arrangement makes it possible to back up and transmit data signals of a quantity matching the transfer speed of the ISDN line, which is slower than that of the private line 3. For instance, by dividing data signal of 1.5 Mbps on the private line into data signals of 384 Kbps as the links 1 through 4, and by extracting data signals of the links 3 and 4 alone and transmitting them at a speed of 768 Kbps, it is possible to transmit them over the low-speed ISDN line.

Figure 4:
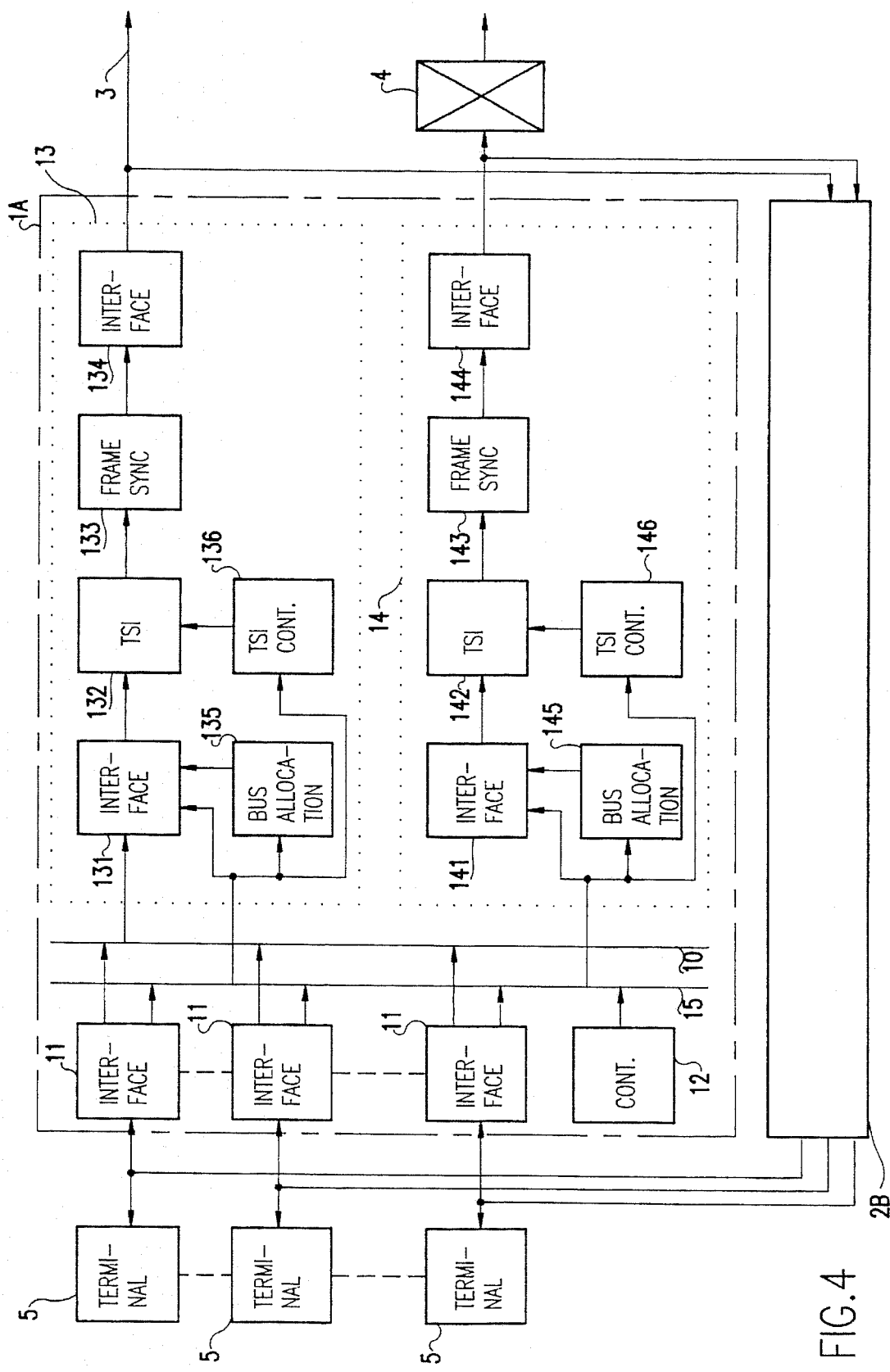
FIG. 4 is a block diagram illustrating a part of a preferred embodiment of the invention.
Figure 5:
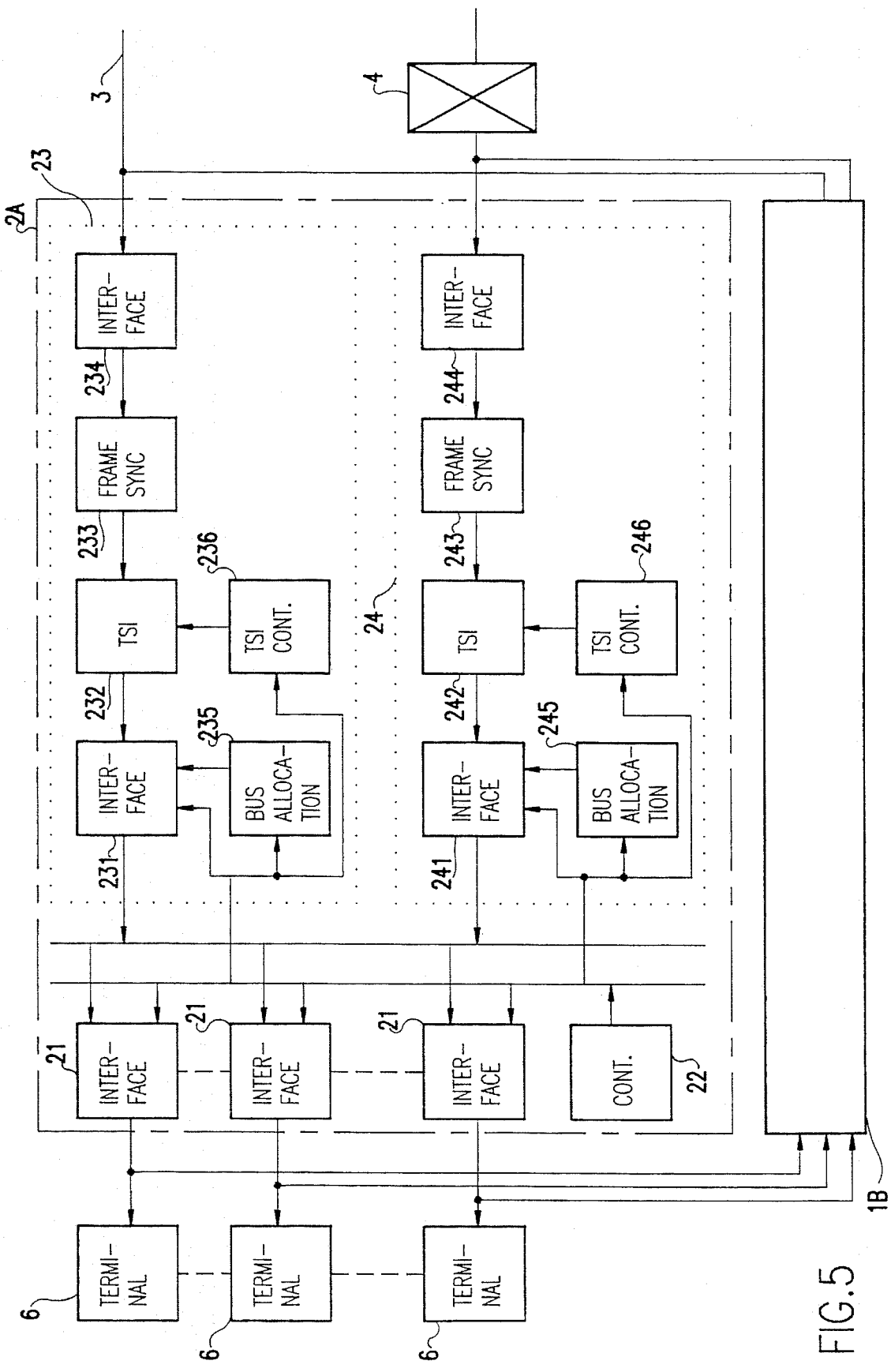
FIG. 5 is a block diagram illustrating another part of the preferred embodiment of the invention.

FIGS. 4 and 5 are block diagrams respectively of the west side multiplexer and demultiplexer 1A and 2B and the east side multiplexer and demultiplexer 2A and 1B for use in the present invention, wherein parts having equivalents in FIG. 1 are assigned respectively the same reference numerals. Whereas transmission from the unit 1A to the unit 2A will be described with reference to FIGS. 4 and 5 for the sake of brevity, transmission from the unit 1B to the unit 2B takes place in the same manner.

In FIG. 4, the west side multiplexer 1A has terminal interfaces 11 corresponding to terminals 5 under its control; a multiplexed data bus 10; a control bus 15; a private line interface 13; an ISDN line interface 14; and a control section 12 for controlling the whole multiplexer 1A.

The private line interface 13 has a bus interface 131 for the multiplexed data bus 10 and a transmission path interface 134. A bus allocation memory 135 stores multiplexed information signals which indicate data signals to be taken out the bus 10. A time slot interchange (TSI) controller 136 stores time slot arrangement information signals which shows the order of the data signals on the transmission path. A TSI memory 132 interchanges time slots under the control of the TSI controller 136 as illustrated in FIG. 3.

The ISDN interface 14 has the same configuration as the private line interface 13, and equivalent parts to the constituent elements of the private line interface 13 are assigned reference numerals whose less significant digits are the same as those of the corresponding elements in the private line interface 13. The multiplexer 1B on the part of the opposite station, shown in FIG. 5, is also the same as the multiplexer 1A of FIG. 4, and accordingly its description is dispensed with.

In this configuration, signals from the terminals 5 are terminated by the terminal interfaces 11, and supplied to the multiplexed data bus 10 in accordance with first multiplexing information signals, preset by the control section 12 via the control bus 15.

On the multiplexed data bus 10, signals from a plurality of terminal interfaces 11 are multiplexed in accordance with the first multiplexing information signals, and entered into the private line interface 13 as input multiplexed signals. In this private line interface 13, the arrangements of second multiplexing information signals (the links 1, 2, 3 and 4 shown in FIG. 3) and time slots on the transmission path are preset in the bus allocation memory 135 and the TSI controller 136 from the control section 12 via the control bus 15. When the private line 3 is to be used, the bus interface line 131 connects the multiplexed data bus 10 and the TSI memory 132 under the control of the control section 12.

The TSI memory 132 converts the input multiplexed signals to the time slot arrangement on the private line under the control of the TSI controller 136, and provides them to a synchronizing circuit 133 as converted multiplexed signals. The synchronizing circuit 133 inserts sub-multiframes, and the transmission path interface 134 performs transmission path frame insertion and level conversion and supplies the signals having undergone these operations to the high-speed digital private line 3 as high-speed digital signals.

In this processing, it is supposed that the control section 12 controls the bus interface 141 via the control bus 15, and that the ISDN interface 14 is isolated.

The east side demultiplexer 2A, shown in FIG. 5, connects the signals to the terminal 6 in a sequence of operations reverse to what was described above, and thereby enables communication to take place between the terminals 5 and 6. The control section 22 has first and second multiplexed information signals similar to those of the control section 12 of the unit 1A, and separates the signals in accordance with these information signals.

On the other hand, in the ISDN interface 14, the arrangements of back-up multiplexing information signals (the links 3 and 4 in FIG. 2) and back-up time slots on the ISDN line are preset in the bus allocation memory 145 and the TSI controller 146 from the control section 12 via the control bus 15. When the ISDN network 4 is to be used, the bus interface line 141 connects the multiplexed data bus 10 and the TSI memory 142 under the control of the control section 12.

This TSI memory 142 converts the input multiplexed signals to the time slot arrangement on the line in accordance with the back-up multiplexed information signals, and provides back-up multiplexed signals to a synchronizing circuit 143. The synchronizing circuit 143 inserts sub-multiframes, and the transmission path interface 144 performs transmission path frame insertion and level conversion and supplies the signals having undergone these operations to the ISDN network 4 as back-up digital signals.

In this processing, it is supposed that the control section 12 controls the bus interface 131 via the control bus 15, and that the ISDN interface 13 is isolated.

The control section 12 monitors alarms on the high-speed digital private line 3 from the private line interface 13 via the control bus 15. If no alarm is detected, the control section 12 judges that the high-speed digital private line 3 is in a normal state and activates the bus interface 131 in the private line interface 13, and the bus interface 141 in the ISDN interface 14 is isolated. In this way, communication takes place using the high-speed digital private line 3.

When an alarm is issued on the high-speed digital private line 3, the control section 12 isolates the bus interface 131 in the private line interface 13, activates the bus interface 141 in the ISDN interface 14, and at the same time gives a call initiation instruction to the ISDN interface 14. It should be noted that an alarm is issued by the detection of error rates as an example.

The ISDN interface 14, in accordance with preset call initiation information (a telephone number or the like), connects the ISDN line. The ISDN line is connected to the demultiplexer 2A of the called party via the ISDN network 4.

Upon detection of arrival of a call, the control section 22 of the multiplexer 2 on the called party's side, in the same manner as that of the multiplexer 1A on the calling party's side, isolates the private line interface 23 and activates the ISDN interface 24 to enable communication using the ISDN network 4 to take place.

Since only the links to be backed up are set in a bus allocation memory 245 in the ISDN interface 24, only the lines set to the links to be backed up are backed up.

What is claimed is:

1. A transmission path back-up system using an exchange line as a back-up line in response to any trouble on a digital private line comprising: multiplexing means for dividing a set of time slots on said digital private line into a first set of time slots to accommodate the group of signals to be backed up and a second set of time slots to accommodate the group of signals not to be backed up so that the two groups be separately multiplexed; and means for sending out these multiplexed signals on said digital private line as transmission path when the digital private line is in a normal state, or selectively extracting said group of signals to be backed up and sending them out to said exchange line when the digital private line is in trouble.

2. A transmission path back-up system, as claimed in claim 1, wherein said first set of time slots are preset at a data capacity permitting transmission over said exchange line.

3. A transmission path back-up system, as claimed in claim 1, wherein said exchange line is an ISDN public line.

4. A transmission path back-up system, as claimed in claim 2, wherein said exchange line is an ISDN public line.

5. A transmission path back-up system comprising:
   A) information generator means for generating information signals;
   B) transmitter means for transmitting multiplexed signals including:
      i) a first transmitter circuit provided with multiplexing means responsive to first multiplexed information signals for multiplexing said information signals and thereby generating first multiplexed signals, converter means for converting said first multiplexed signals into second multiplexed signals having first sub-group signals and second sub-group signals, and transmission control means for transmitting said second multiplexed signals;
      ii) a second transmitter circuit for sending out only said second sub-group signals; and
      iii) a transmission switching circuit for switching between said first and second transmitter circuits; and
   C) receiver means for receiving signals from said transmitter means comprising:
      i) a first receiver circuit having reverse converter means, connected to said first transmitter circuit by a private line, for reversely converting said second multiplexed signals into said first multiplexed signals in accordance with third multiplexed information signals; separator means for separating the reversely converted first multiplexed signals into the information signals in accordance with fourth multiplexed information signals; and a reception control circuit for generating said third and fourth multiplexed information signals;
      ii) a second receiver circuit connected to said second transmitter circuit by an exchange line; and
      iii) a reception switching circuit for switching between said first and second receiver circuits.

6. A transmission path back-up method using an exchange line as a back-up line in response to any trouble on a digital private line comprising: dividing a set of time slots on said digital private line into a first set of time slots to accommodate the group of signals to be backed up and a second set of time slots to accommodate the group of signals not to be backed up so that the two groups be separately multiplexed; and sending out these multiplexed signals on said digital private line as transmission path when the digital private line is in a normal state, or selectively extracting said group of signals to be backed up and sending them out to said exchange line when the digital private line is in trouble.

* * * * *